United States Patent
Hsiao et al.

(10) Patent No.: US 7,639,938 B2
(45) Date of Patent: **\*Dec. 29, 2009**

(54) TWO-STEP FOCUS LENS OF AUTO-FOCUSING CAMERA

(75) Inventors: Cheng-Fang Hsiao, Tu-Cheng (TW);
Ching-Hsing Huang, Tu-Cheng (TW);
Chien-Long Hong, Tu-Cheng (TW);
Chin-Hung Chang, Tu-Cheng (TW);
Jen-Hung Chung, Tu-Cheng (TW);
Fong-Tan Yu, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 488 days.

This patent is subject to a terminal disclaimer.

(21) Appl. No.: 11/309,675

(22) Filed: Sep. 8, 2006

(65) Prior Publication Data
US 2008/0063390 A1    Mar. 13, 2008

(51) Int. Cl.
G03B 3/10 (2006.01)
G02B 7/02 (2006.01)
(52) U.S. Cl. .................. 396/133; 359/824
(58) Field of Classification Search ............ 359/824, 359/696; 396/133, 531; 348/357
See application file for complete search history.

(56) References Cited

U.S. PATENT DOCUMENTS

| 2,660,527 | A | * | 11/1953 | Naumann | 396/94 |
| 4,605,031 | A | * | 8/1986 | Grund | 137/15.17 |
| 5,612,740 | A | * | 3/1997 | Lee et al. | 348/345 |
| 6,964,030 | B2 | * | 11/2005 | Hong et al. | 716/12 |
| 7,480,004 | B2 | * | 1/2009 | Lee et al. | 348/357 |
| 2002/0190828 | A1 | * | 12/2002 | Lee et al. | 335/302 |
| 2004/0195931 | A1 | * | 10/2004 | Sakoda | 310/268 |
| 2006/0066746 | A1 | | 3/2006 | Lee et al. | |
| 2006/0228099 | A1 | * | 10/2006 | Chiang | 396/133 |
| 2007/0223903 | A1 | * | 9/2007 | Ho et al. | 396/85 |

FOREIGN PATENT DOCUMENTS

| JP | 7-15939 A | 1/1995 |
| JP | 2005-195912 A | 7/2005 |

* cited by examiner

*Primary Examiner*—WB Perkey
*Assistant Examiner*—Leon W Rhodes
(74) *Attorney, Agent, or Firm*—Frank R. Niranjan

(57) ABSTRACT

An auto-focusing lens of a camera includes a lens unit (11), a permanent magnet (12) being fixedly mounted around the lens unit to move with the lens unit, a first coil seat (15a) arranged on a first side of the magnet with a first winding (14a) wound thereon, and a second coil seat (15b) arranged on a second side opposite to the first side of the magnet with a second winding (14b) wound thereon. The first and second windings and the first and second coil seats are provided for establishing magnetic fields when electric currents are applied to the first and second windings. The magnetic fields interact with the magnetic field of the permanent magnet to drive the lens unit into movement between its front focus point (A) and its rear focus point (B).

12 Claims, 4 Drawing Sheets

TWO-STEP FOCUS LENS OF AUTO-FOCUSING CAMERA

FIELD OF THE INVENTION

The present invention relates generally to a lens drive mechanism of a camera, and more particularly to a lens drive mechanism of a two-step auto-focusing lens of a camera.

DESCRIPTION OF RELATED ART

Usually we need a camera to record the memorable moments. The designs of cameras have evolved toward lightweight and compactness, so have the currently popular digital cameras. Conventionally, an auto focus structure is used for controlling the telescopic movement of a lens of the camera.

The auto focus structure of the camera focuses on an object by comparing with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by an annular cam. The annular cam is provided with a lens driving structure and driven to rotate by a stepping motor. At the moment when the CPU detects the clearest image as the lens moves back and forth, a stop signal is simultaneously sent to the lens. Therefore, the lens stops at the best focal position (static position). When the lens is to be moved back to the original position, the annular cam starts to rotate again. Once the lens moves back to its original position, the photo interrupter installed by the lens cylinder uses the shutter at the border of the lens cylinder, to detect the original position of the lens. The shutter will interrupt the light of the penetration-type photo interrupter. The lens stops at the moment when the photo interrupter detects the original position.

Consequently, the lens in a digital camera auto focus system has to be driven continuously, so is the image detection. Every time an image is captured, the lens has to return to its original position. This method of searching for an optimal focal point makes use of mechanical and continuous lens motion to repeatedly check the image. Thus, the lens focusing procedure is very time-consuming, which, in most of cases, results in losing the best image-capturing time.

SUMMARY OF THE INVENTION

According to a preferred embodiment of the present invention, a two-step focus lens of an auto-focusing camera includes a lens unit, a permanent magnet being fixedly mounted around the lens unit to move with the lens unit, a first coil seat arranged on a first side of the magnet with a first winding wound thereon, and a second coil seat arranged on a second side opposite to the first side of the magnet with a second winding wound thereon. The first and second windings are used for inducing the first and second coil sets to generate magnetic fields when electric currents are applied to the first and second windings. The magnetic fields interact with the magnetic field of the permanent magnet to drive the lens unit into movement between its front focus point and its rear focus point.

Other advantages and novel features of the present invention will be drawn from the following detailed description of a preferred embodiment of the present invention with attached drawings, in which:

BRIEF DESCRIPTION OF THE DRAWINGS

Many aspects of the present two-step focus lens of auto-focusing camera can be better understood with reference to the following drawings. The components in the drawings are not necessarily drawn to scale, the emphasis instead being placed upon clearly illustrating the principles of the present two-step focus lens of auto-focusing camera. Moreover, in the drawings, like reference numerals designate corresponding parts throughout the several views.

DETAILED DESCRIPTION OF THE INVENTION

Figure 1:
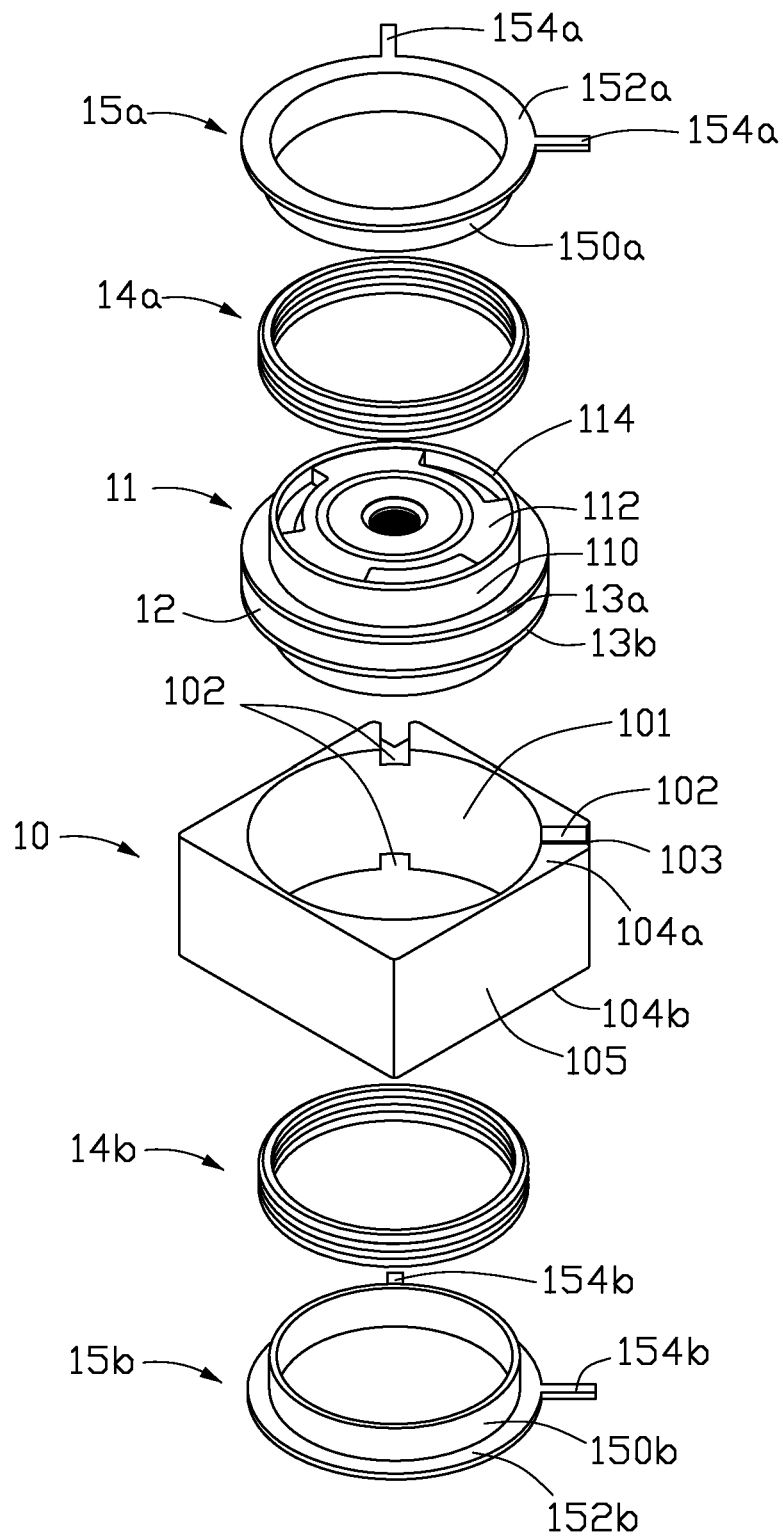
FIG. 1 is an isometric, exploded view of a two-step focus lens of an auto-focusing camera in accordance with a preferred embodiment of the present invention.
Figure 2:
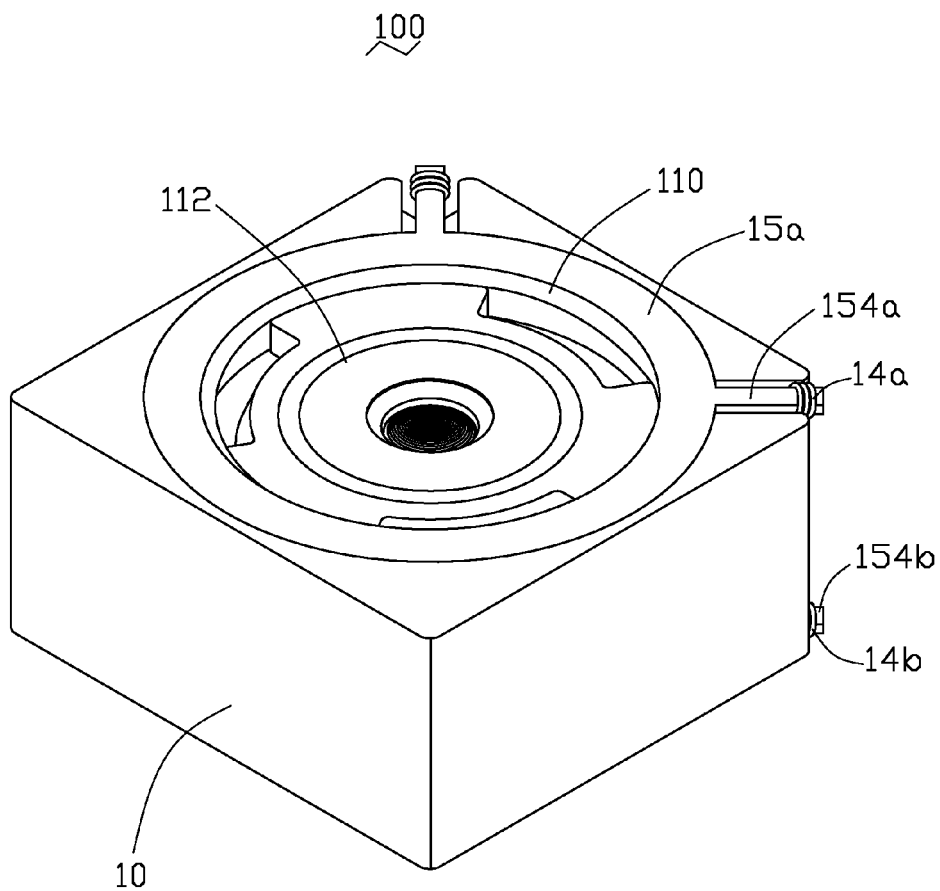
FIG. 2 is an isometric, assembled view of the two-step focus lens of FIG. 1.
Figure 3:
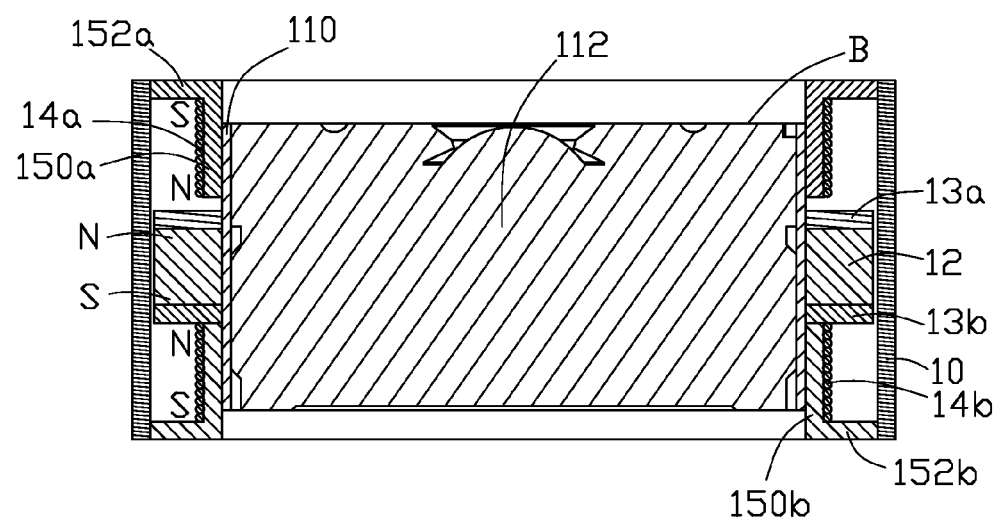
FIG. 3 shows a cross-sectional view of the two-step focus lens with a lens unit at its rear focal point.
Figure 4:
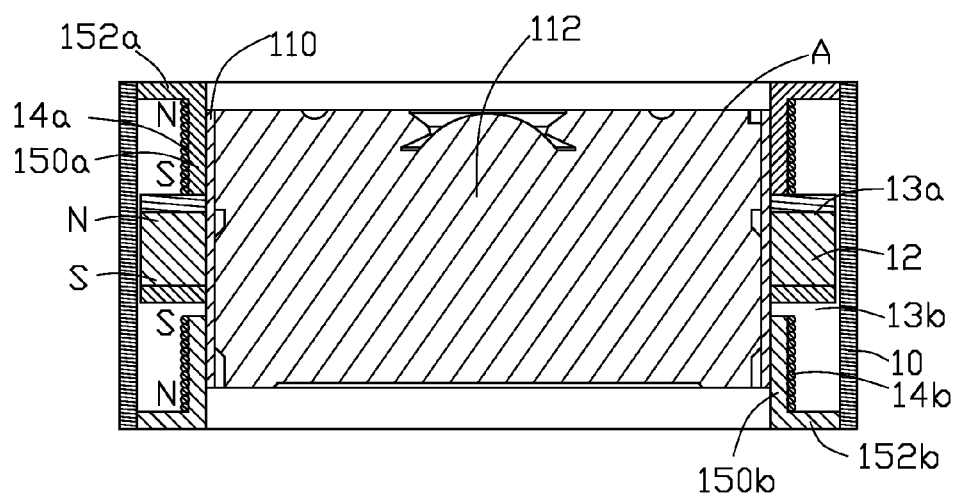
FIG. 4 is similar to FIG. 3, but showing the lens unit of the two-step focus lens at its front focal point.

Referring to FIGS. 1-2, a two-step focus lens of an auto-focusing camera according to a preferred embodiment includes a lens mount 10, a lens unit 11 received in the lens mount 10, and a motor mounted around the lens unit 11. During operation of the focus lens, the motor drives the lens unit 11 into telescopic movement between a front focal point A (as shown in FIG. 4) and a rear focal point B (as shown in FIG. 3).

The lens mount 10 is cuboid-shaped, and includes a top surface 104a and a bottom surface 104b parallel to the top surface 104a. Each of the top and bottom surfaces 104a, 104b is square-shaped, and includes four sides connected end to end. Any two adjacent sides are perpendicular to each other and form a corner at the joint junction thereof. Four sidewalls 105 interconnect the four sides of the top and bottom surfaces 104a, 104b, respectively. A cylinder-shaped space 101 is defined in a central portion of the lens mount 10 for receiving the lens unit 11 therein. The space 101 extends through the top and bottom surfaces 104a, 104b of the lens mount 10. A pair of slots 102 is defined in adjacent two corners of the top surface 104a, respectively. Also the bottom surface 104b defines two slots 102 therein corresponding to the slots 102 of the top surface 104a. The slots 102 extend from an inner circumference to an outer-peripheral of the lens mount 10 and communicate with the space 101 of the lens mount 10. Two grooves 103 are defined in the joint junctions of the sidewalls 105, respectively, and communicate with the slots 102 of the top and bottom surfaces 104a, 104b.

The lens unit 11 is approximately disc-shaped and has an outer diameter smaller than an inner diameter of the space 101 of the lens mount 10. The lens unit 11 includes a lens barrel 114 and a lens 112 fixedly mounted in the lens barrel 114. When the lens unit 11 is received in the lens mount 10, an annular interspace is defined therebetween for mounting the motor. The motor has an outer diameter approximately the same as the inner diameter of the space 101 of the lens mount 10, and an inner diameter approximately the same as the outer diameter of the lens unit 11. The motor includes a permanent magnet 12 mounted around the lens barrel 114 and attached to a middle of an outer surface 110 of the lens barrel 114, and upper and lower coil seats 15a, 15b being arranged at upper and lower sides of the magnet 12, respectively. The coil seats 15a, 15b are made of material such as silicone steel, which can be easily magnetized when a magnetic field is applied thereto. Each of the coil seats 15a, 15b includes a ring-shaped base wall 152a, 152b and a flange 150a, 150b extending perpendicularly from an inner circumference of the base wall 152a, 152b. The base walls 152a, 152b of the upper and lower coil seats 15a, 15b each form two pins 154a, 154b thereon. The pins 154a, 154b extend radially and outwardly from an outer-peripheral of a corresponding base wall 152a, 152b. The two pins 154a, 154b of each base wall 152a, 152b are perpendicular to each other and correspond to the slots 102 of the lens mount 10.

Upper and lower windings 14a, 14b are wound around the flanges 150a, 150b of the upper and lower coil seats 15a, 15b, respectively. The upper and lower windings 14a, 14b are wound in opposite directions. The upper winding 14a is wound around the flange 150a along the clockwise direction, whilst the lower winding 14b is wound around the flange 150b along the counterclockwise direction. Alternatively, the upper winding 14a can be wound counterclockwise, and the lower winding 14b is wound clockwise. When electric currents are applied to the upper and lower windings 14a, 14b, induced magnetic fields established by the two windings 14a, 14b have polarities opposite to each other. Each of the upper and lower windings 14a, 14b has two ends that are wound around the two pins 154a, 154b of a corresponding coil seat 15a, 15b before connecting with a power source (not shown) for supplying the electric currents. After being wound around the two pins 154a, the two ends of the upper winding 14a are extended downwardly along the grooves 103 to connect with the power source.

When assembled, the magnet 12 is fixedly adhered to the middle of the outer surface 110 of the lens barrel 114 of the lens unit 11. The lens unit 11 with the magnet 12 is then movably received in the space 101 of the lens mount 10. The upper and lower coil seats 15a, 15b with the upper and lower windings 14a, 14b wound thereon are received in the space 101 and are arranged on the upper and lower sides of the magnet 12, respectively. The pins 154a of the upper coil seat 15a are received in the slots 102 of the top surface 104a of the lens mount 10, and the pins 154b of the lower coil seat 15b are received in the slots 102 of the bottom surface 104b of the lens mount 10. The pins 154a, 154b are fixedly engaged into the slots 102 by soldering to fix the upper and lower coil seats 15a, 15b to the lens mount 10. The ends of the windings 14a, 14b are wound around with the pins 154a, 154b. A top surface of the base wall 152a of the upper coil seat 15a and the top surface 104a of the lens mount 10 are coplanar, whilst a bottom surface of the base wall 152b of the lower coil seat 15b and the bottom surface 104b of the lens mount 10 are coplanar. An upper magnetically shielding layer 13a is located between the upper coil seat 15a and the upper side of the magnet 12. A lower magnetically shielding layer 13b is arranged between the lower coil seat 15b and the lower side of the magnet 12. The shielding layers 13a, 13b are made of electrically conductive material, such as copper. The two shielding layers 13a, 13b are adhered to the upper and lower sides of the magnet 12, respectively. As shown in FIG. 3, the lens unit 11 is at its rear focal point B. The flange 150b of the lower coil seat 15b abuts the lower shielding layer 13b, whilst the flange 150a of the upper coil seat 15a is spaced from the upper shielding layer 13a. A distance is defined between the upper coil seat 15a and the upper shielding layer 13a.

FIGS. 3-4 show the situations of the lens unit 11 of the two-step focus lens at its rear focal point B and its front focal point A. Firstly, the lens unit 11 is at its rear focal point B (as shown in FIG. 3) and moves from its rear focal point B to its front focal point A. During the operation, electric currents are applied to the windings 14a, 14b wound on the coil seats 15a, 15b. Each of the windings 14a, 14b establishes an induced magnetic field. In this embodiment, the upper side of the magnet 12 is N (North Pole), and the lower side of the magnet 12 is S (South Pole). The induced magnetic field of the upper winding 14a has polarities the same as that of the magnet 12. A top end of the upper coil seat 15a near the top surface 104a of the lens mount 10 is N, whilst a bottom end of the upper coil seat 15a near the upper side of the magnet 12 is S. Reversely, the induced magnetic field of the lower winding 14b has polarities opposite to that of the magnet 12. A bottom end of the lower coil seat 15b near the bottom surface 104b of the lens mount 10 is N, whilst a top end of the lower coil seat 15b near the lower side of the magnet 12 is S. Thus an attractive force is generated between the upper coil seat 15a and the magnet 12, whilst a repelling force is generated between the lower coil seat 15b and the magnet 12. The lens unit 11 with the magnet 12 fixedly mounted thereon moves upwardly to its front focal point A from the top end of the lower coil seat 15b to the bottom end of the upper coil seat 15a. As shown in FIG. 4, when the lens unit 11 is at its front focal point A, the upper shielding layer 13a abuts the bottom end of the flange 150a of the upper coil seat 15a, and the lower shielding layer 13b is spaced from the top end of the flange 150b of the lower coil seat 15b. When the lens unit 11 reaches the front focal point A, the electric currents supplied to the upper and lower windings 14a, 14b are switched off. The coil seats 15a, 15b have residual magnetic forces to interact with the magnetic force of the permanent magnet 12 thereby holding the lens unit 11 at the front focal point A.

On the other hand, when the lens unit 11 is at the front focal point A (as shown in FIG. 4) and moves to the rear focal point B, the electric currents are applied to the windings 14a, 14b with a direction different from that for moving the lens units 11 from the rear focal point B to the front focal point A. At this situation, the polarities of the upper and lower coil seats 15a, 15b are switched accordingly. The induced magnetic field of the upper winding 14a has polarities opposite to that of the magnet 12. The top end of the upper coil seat 15a is S, whilst the bottom end of the upper coil seat 15a is N. Reversely, the induced magnetic field of the lower winding 14b has polarities the same as that of the magnet 12. The bottom end of the lower coil seat 15b is S, whilst the top end of the lower coil seat 15b is N. Attractive force is generated between the lower coil seat 15b and the magnet 12, and repelling force is generated between the upper coil seat 15a and the magnet 12. The lens unit 11 with the magnet 12 moves downwardly to its rear focal point B (as shown in FIG. 3) from the bottom end of the upper coil seat 15a to the top end of the lower coil seat 15b by the attractive force of the lower coil seat 15b and the repelling force of the upper coil seat 15a. On reaching the rear focal point B, the electric currents supplied to the windings 14a, 14b with a different direction are switched off. The lens unit 11 is held in position by an interaction between the magnetic force of the magnet 12 and residual magnetic forces of the coil seats 15a, 15b. A thickness of each of the shielding layers 13a, 13b is so decided that the interaction between the magnet 12 and the windings 14a, 14b and the coil seats 15a, 15b will generate a force which can smoothly move the lens unit 11 with a predetermined speed between the front and rear focal points A, B.

As the polarities of the two coil seats 15a, 15b are different from each other, an attractive force is generated between one of the coil seats 15a, 15b and the magnet 12, and a repelling force is generated between the other one of the coil seats 15a, 15b and the magnet 12. The magnet 12 thus can have a telescopic movement between its front focal point A and rear focal point B. In the preferred embodiment, the upper and lower windings 14a, 14b are wound along opposite directions. Also the two windings 14a, 14b can be wound along the same direction. In this situation, the directions of the electric currents applied to the upper and lower windings 14a, 14b are opposite to each other, to thereby establish two different induced magnetic fields. It can also be understood that when the polarities of the magnet 12 is exchanged, the direction of the electric currents applied to the windings 14a, 14b should be changed accordingly. This means that when the upper side of the magnet 12 is S, and the lower side of the magnet 12 is N and when the lens unit 11 moves from its rear focal point B to its front focal point A, the top end of the upper coil seat 15a is S, and the bottom end of the upper coil seat 15a is N. Meanwhile, the top end of the lower coil seat 15b is N, and the bottom end of the lower coil seat 15b is S. Attractive force is generated between the upper coil seat 15a and the magnet 12, and repelling force is generated between the lower coil seat 15b and the magnet 12. The lens unit 11 with the magnet 12 moves upwardly to its front focal point A. When the lens unit 11 moves from its front focal point A to its rear focal point B, directions of the electric currents applied to the windings 14a, 14b are switched to change the polarities of the coil seats 15a, 15b. The top end of the upper coil seat 15a is N, and the bottom end of the upper coil seat 15a is S. Meanwhile, the top end of the lower coil seat 15b is S, and the bottom end of the lower coil seat 15b is N. Attractive force is generated between the lower coil seat 15b and the magnet 12, and repelling force is generated between the upper coil seat 15a and the magnet 12. The lens unit 11 with the magnet 12 moves downwardly to its rear focal point B. Thus the lens unit 11 can switch between its rear focal point B and front focal point A easily. The focusing procedure is easy and convenient. As the coil seats 15a, 15b are made of magnetizable material which has residual magnetic force when the electric currents supplied to the windings 14a, 14b are switched off, the lens unit 11 can be kept at its focal points without consuming any power. Thus, the focus lens according to the present invention can save precious power of a digital device, for example, a digital camera incorporating the focus lens. Moreover, this focus lens according to the present invention has a very simple structure and can be easily assembled.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. An auto-focusing lens of a camera comprising:
   a lens unit;
   a permanent magnet being fixedly mounted around the lens unit to move with the lens unit;
   a first coil seat arranged on a first side of the magnet with a first winding wound thereon; and
   a second coil seat arranged on a second side opposite to the first side of the magnet with a second winding wound thereon, each winding establishing a magnetic field when an electric current is applied to the winding, the magnetic fields of the first and second windings interacting with the magnetic field of the permanent magnet to drive the lens unit into movement between its front focus point and its rear focus point;
   wherein each of the first and second coil seats includes a ring-shaped base wall, a flange extending from an inner circumference of the base wall, and two pins extending radially and outwardly from an outer-periphery of the base wall, the two pins of each base wall being perpendicular to each other, the first winding being wound around the flange of the first coil seat with two ends thereof wound around the two pins of the first coil seat, respectively, the second winding being wound around the flange of the second coil seat with two ends thereof wound around the two pins of the second coil seat, respectively.

2. The auto-focusing lens as claimed in claim 1, wherein a first magnetically shielding layer is arranged between the magnet and the first coil seat, and a second magnetically shielding layer is arranged between the magnet and the second coil seat.

3. The auto-focusing lens as claimed in claim 2, wherein the two shielding layers are made of copper.

4. The auto-focusing lens as claimed in claim 2, wherein the first and second shielding layers are adhered to the first and second sides of the magnet, respectively, one of the two coil seats abutting a corresponding shielding layer, and the other coil seat being spaced from the other shielding layer when the lens unit stopped at one of its front focus point and its rear focus point.

5. The auto-focusing lens as claimed in claim 1, further comprising a lens mount receiving the lens unit therein, the lens mount comprising a top surface and a bottom surface parallel to each other, each of the top and bottom surfaces defining two slots receiving the pins therein.

6. The auto-focusing lens as claimed in claim 5, wherein the lens mount is cuboid-shaped, the slots are defined in two adjacent corners of the lens mount.

7. The auto-focusing lens as claimed in claim 6, wherein the lens unit is disc-shaped and includes a lens barrel and a lens being fixedly mounted in the lens barrel, the magnet adhered to a middle of an outer surface of the lens barrel.

8. An auto-focusing lens of a camera comprising:
   a lens unit; and
   a motor mounted around the lens unit for driving the lens unit into movement between its front focus point and its rear focus point, comprising:
   a first coil seat and a second coil seat arranged at two sides of the lens unit, respectively;
   a first and second windings wound around the first and second coil seats, respectively, the first and second windings being adapted for establishing magnetic fields of opposite polarities when electric currents are applied to the two windings; and
   a permanent magnet being fixedly mounted around the lens unit to move with the lens unit, the permanent magnet being arranged between the first and second coil seats, the magnet moving between the upper and lower coil seats under an interaction of the magnetic fields established by the windings and a magnetic field of the permanent magnet, a magnetically shielding layer arranged between each coil seat and the magnet.

9. The auto-focusing lens as claimed in claim 8, wherein each of the coil seats includes a ring-shaped base wall and a flange having one of the winding wound thereon and extending from an inner circumference of the base wall, two pins extending radially and outwardly from an outer-periphery of the base wall, the two pins being perpendicular to each other.

10. The auto-focusing lens as claimed in claim 9, further comprising a lens mount receiving the lens unit and the motor therein, a plurality of slots being defined in the lens mount receiving the pins therein.

11. The auto-focusing lens as claimed in claim 8, wherein the lens unit includes a lens barrel and a lens being fixedly mounted in the lens barrel, the magnet adhered to a middle of an outer surface of the lens barrel, the magnetically shielding layers being adhered to the magnet and formed at two opposite sides of the magnet.

12. A two-step focus lens for a digital device comprising:
a lens mount;
a first coil set fixedly mounted on a first side of the lens mount, the first coil set being wound with a first winding thereon;
a second coil set fixedly mounted on a second side of the lens mount, the second coil set being wound with a second winding thereon;
a lens unit mounted in the lens mount and movable between the first and second sides thereof the lens unit having a lens and a permanent magnet thereon, the lens being positioned at one of front focal point and rear focal point of the lens;
wherein when electric currents are supplied to the first and second windings, the first and second coil seats have magnetic fields interacting with a magnetic field of the magnet to generate forces to move the lens unit in the lens mount, the force generated by one of the first and second coil sets and the magnet being force of attraction, the force generated by the other of the first and second coil sets and the magnet being force of repulsion; and
wherein metal layers are disposed onto two opposite surfaces of the magnet.

* * * * *

UNITED STATES PATENT AND TRADEMARK OFFICE
CERTIFICATE OF CORRECTION

PATENT NO. : 7,639,938 B2  Page 1 of 1
APPLICATION NO. : 11/309675
DATED : December 29, 2009
INVENTOR(S) : Hsiao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Ninth Day of November, 2010

David J. Kappos
*Director of the United States Patent and Trademark Office*